(12) United States Patent
Busin

(10) Patent No.: US 10,848,919 B2
(45) Date of Patent: Nov. 24, 2020

(54) NETWORK NODE, CONTROLLING NETWORK NODE AND METHODS PERFORMED THEREIN

(71) Applicant: Telefonaktiebolaget LM Ericsson (publ), Stockholm (SE)

(72) Inventor: Åke Busin, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/480,875

(22) PCT Filed: Feb. 23, 2017

(86) PCT No.: PCT/SE2017/050171
§ 371 (c)(1),
(2) Date: Jul. 25, 2019

(87) PCT Pub. No.: WO2018/156060
PCT Pub. Date: Aug. 30, 2018

(65) Prior Publication Data
US 2019/0364388 A1 Nov. 28, 2019

(51) Int. Cl.
*H04W 4/029* (2018.01)
*H04W 64/00* (2009.01)

(52) U.S. Cl.
CPC ......... *H04W 4/029* (2018.02); *H04W 64/003* (2013.01)

(58) Field of Classification Search
CPC .................. H04W 4/029; H04W 64/003
See application file for complete search history.

(56) References Cited

U.S. PATENT DOCUMENTS

| 2012/0264443 A1* | 10/2012 | Ng ....................... H04W 60/04 455/450 |
| 2015/0141052 A1* | 5/2015 | Bolin .................... H04W 4/029 455/456.2 |

FOREIGN PATENT DOCUMENTS

| CN | 1703927 A | 11/2005 |
| CN | 101411218 A | 4/2009 |
| CN | 101478741 A | 7/2009 |
| CN | 104066170 A | 9/2014 |
| CN | 104427476 A | 3/2015 |

(Continued)

OTHER PUBLICATIONS

Author Unknown, "Technical Specification Group Services and System Aspects; Functional stage 2 description of Location Services (LCS) (Release 13)," Technical Specification 23.271, Version 13.0.0, 3GPP Organizational Partners, Sep. 2015, 172 pages.

(Continued)

*Primary Examiner* — Nizar N Sivji
(74) *Attorney, Agent, or Firm* — Withrow & Terranova, PLLC

(57) ABSTRACT

Embodiments herein relate to a method performed by a network node for handling positioning of a wireless device in a wireless communication network. The network node determines a set of service areas in which positioning of the wireless device is requested. Furthermore, the network node transmits a request for positioning of the wireless device to a controlling network node, which request comprises an indication of the set of service areas. Also, the network node receives a response from the controlling network node indicating whether the wireless device is positioned within the set of service areas or not.

33 Claims, 9 Drawing Sheets

(56) References Cited

FOREIGN PATENT DOCUMENTS

| WO | 2004034721 A1 | 4/2004 |
|---|---|---|
| WO | 2011052136 A1 | 5/2011 |

OTHER PUBLICATIONS

Author Unknown, "Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 14)," Technical Specification 29.171, Version 14.0.0, 3GPP Organizational Partners, Dec. 2016, 54 pages.

Author Unknown, "Technical Specification Group Core Network and Terminals; Location Services (LCS); Evolved Jacket Core (EPC) LCS Protocol (ELP) between the Gateway Mobile Location Centre (GMLC) and the Mobile Management Entity (MME); SLg interface (Release 13)," Technical Specification 29.172, Version 13.1.0, 3GPP Organizational Partners, Jun. 2016, 40 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.1.0, 3GPP Organizational Partners, Dec. 2016, 654 pages.

Author Unknown, "Technical Specification Group Radio Access Network; Evolved Universal Terrestrial Radio Access (E-UTRA); LTE Positioning Protocol (LPP) (Release 14)," Technical Specification 36.355, Version 14.0.0, 3GPP Organizational Partners, Dec. 2016, 151 pages.

Author Unknown, "Technical Specification Group Radio Access Network; Evolved Universal Terrestrial Radio Access (E-UTRA); LTE Positioning Protocol A (LPPa) (Release 14)," Technical Specification 36.455, Version 14.0.0, 3GPP Organizational Partners, Jan. 2017, 67 pages.

International Search Report and Written Opinion for International Patent Application No. PCT/SE2017/050171, dated Nov. 13, 2017, 8 pages.

First Office Action for Chinese Patent Application No. 201780087337.2, dated Jul. 22, 2020, 19 pages.

* cited by examiner

NETWORK NODE, CONTROLLING NETWORK NODE AND METHODS PERFORMED THEREIN

This application is a 35 U.S.C. § 371 national phase filing of International Application No. PCT/SE2017/050171, filed Feb. 23, 2017, the disclosure of which is incorporated herein by reference in its entirety.

TECHNICAL FIELD

Embodiments herein relate to a network node, a controlling network node and methods performed therein. Furthermore, a computer program and a computer readable storage medium are also provided herein. In particular, embodiments herein relate to handling positioning of the wireless device in a wireless communication network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cell areas, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In wireless communication networks a wireless device is normally put in Idle mode when it has no data to send or receive. This is to lower energy consumption and also to save radio resources. When being in Idle mode the wireless device is only mandated to report a change of cell or service area when it passes a border of a set of one or more Tracking Areas (TA). Thus, in wireless communication networks, if the wireless device is in Idle mode, the wireless communication network may only assume to know the location of a wireless device with a resolution of a set of tracking areas. To instantly get more accurate location information in such cases the wireless device must be paged and brought into connected mode.

Thus, to learn the position of a wireless device with a sub tracking area resolution when in Idle mode the wireless device has to be brought to connected mode by a paging procedure. The paging procedure can e.g. be part of a positioning procedure in the wireless communication network. As connected mode is resource consuming the wireless device will normally be brought back to Idle mode within a short timeframe. Thus the paging need to be repeated with an interval that depends on the acceptable temporal resolution of the wanted position information. To repeatedly bring wireless devices to connected mode however consumes large amount of resources from the wireless device if done frequently and from the wireless communication network if done for many wireless devices.

SUMMARY

An object herein is to provide a mechanism that localizes a wireless device in a wireless communication network in an efficient manner.

According to an aspect the object is achieved by providing a method performed by a network node for handling positioning of a wireless device in a wireless communication network. The network node determines a set of service areas in which positioning of the wireless device is requested. The network node further transmits, to a controlling network node, a request for positioning of the wireless device, which request comprises an indication of the set of service areas. The network node furthermore receives a response from the controlling network node indicating whether the wireless device is positioned within the set of service areas or not.

According to another aspect the object is achieved by providing a method performed by a controlling network node for positioning of a wireless device in a wireless communication network. The network node receives a request for positioning of the wireless device from a network node, which request comprises an indication of a set of service areas in which positioning of the wireless device is requested. The network node further determines whether the wireless device is within or not within the set of service areas, and transmits, to the network node, a response indicating whether the wireless device is positioned within the set of service areas or not.

According to yet another aspect the object is achieved by providing a network node for handling positioning of a wireless device in a wireless communication network. The network node being configured to determine a set of service areas in which positioning of the wireless device is requested. Furthermore, the network node being configured to transmits a request for positioning of the wireless device to a controlling network node, which request comprises an indication of the set of service areas. The network node being configured to receive a response from the controlling network node indicating whether the wireless device is positioned within the set of service areas or not.

According to still another aspect the object is achieved by providing a controlling network node for positioning of a wireless device in a wireless communication network. The controlling network node being configured to receive a request for positioning of the wireless device from a network node, which request comprises an indication of a set of service areas in which positioning of the wireless device is requested. The controlling network node is further configured to determine whether the wireless device is within or not within the set of service areas, and to transmit, to the network node, a response indicating whether the wireless device is positioned within the set of service areas or not.

It is furthermore provided herein a computer program comprising instructions, which, when executed on at least one processor, cause the at least one processor to carry out any of the methods above, as performed by the network nodes. It is additionally provided herein a computer-readable storage medium, having stored thereon a computer program comprising instructions which, when executed on at least one processor, cause the at least one processor to carry out the method according to any of the methods above, as performed by the network nodes.

As stated above localizing wireless devices is rather resource consuming and it is not a feasible solution to know the position of wireless devices with high temporal and spatial resolution, especially not if done on a large scale. Assuming the intent of positioning is specifically to know, with high temporal resolution if a wireless device is within a specific geographical area, then the wireless device will be paged only in service areas that correspond to a specific geographical area. This implies that the wireless device can stay Idle if not in target geographical area and further the process of paging the wireless device will be performed in the set of service areas which may be a minimized number of service areas. This will lead to an efficient process of localizing wireless devices that are present in a specific geographical area.

BRIEF DESCRIPTION OF THE DRAWINGS

Embodiments will now be described in more detail in relation to the enclosed drawings, in which.

DETAILED DESCRIPTION

Figure 1:
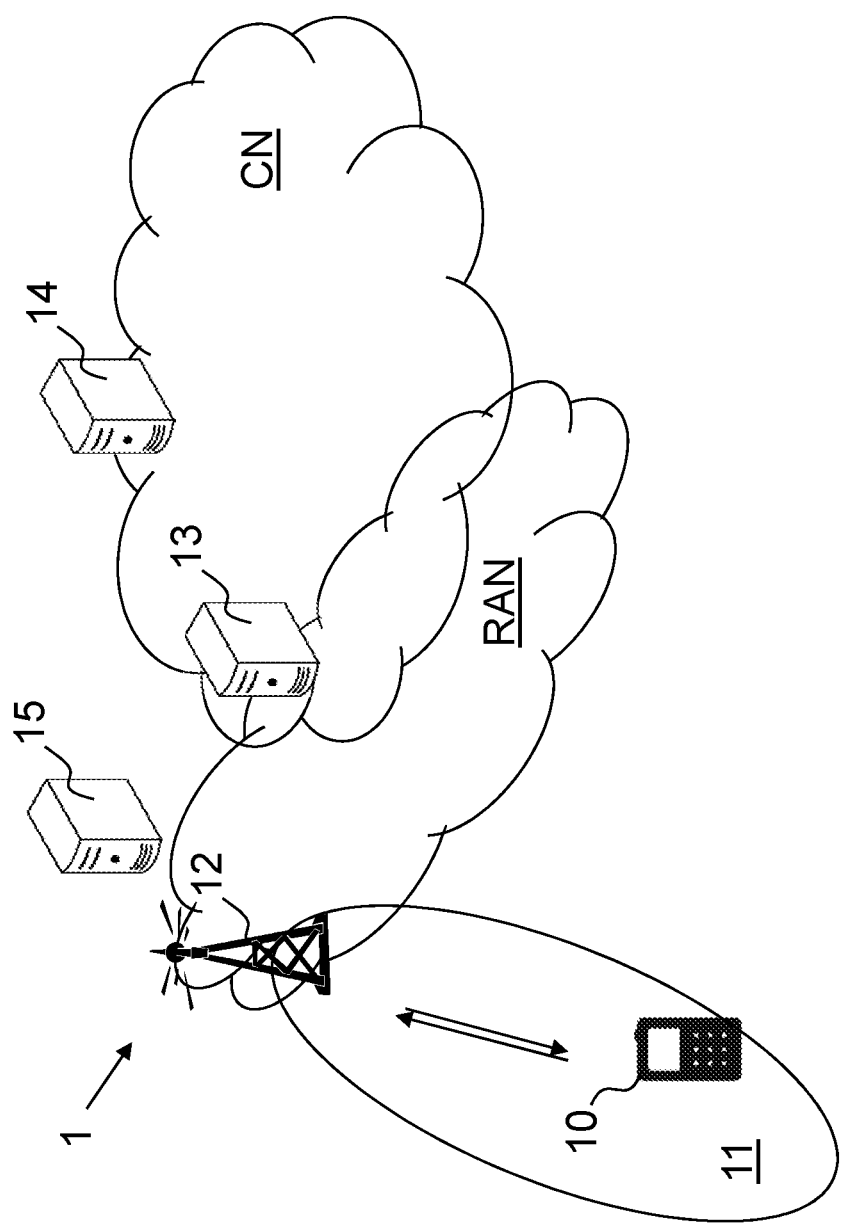
FIG. 1 is a schematic diagram depicting a wireless communications network according to embodiments herein.

Embodiments herein relate to wireless communication networks in general. FIG. 1 is a schematic overview depicting a wireless communications network 1. The wireless communications network 1 comprises one or more RANs and one or more CNs. The wireless communications network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communications networks such as e.g. WCDMA and LTE.

In the wireless communications network 1, a wireless device 10, such as a mobile station, a non-access point (non-AP) station (STA), a STA, a user equipment and/or a wireless terminals, may communicate via one or more Access Networks (AN), e.g. a RAN, to one or more CNs. It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. The radio network node 12 may be a transmission and reception point e.g. a radio-access network node such as a Wireless Local Area Network (WLAN) access point or Access Point Station (AP STA), an access controller, a base station e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node depending e.g. on the radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

The wireless communications network 1 may comprise a controlling network node 13 such as a Mobility Management Entity (MME), a Serving GPRS Support Node (SGSN), a server keeping track of wireless devices, or similar. The controlling network node 13 controls or manages wireless devices in service areas in the wireless communication network 1.

The wireless communications network 1 may further comprise a network node 14 such as a gateway, a location controlling node, a Gateway Mobile Location Centre (GMLC) configured to retrieve location or position of wireless devices in wireless communication network 1.

Furthermore, the wireless communications network 1 may comprise a positioning node 15 configured to calculate or estimate position of wireless devices based on e.g. measurement reports from the wireless devices. The positioning node 15 may be an Evolved Serving Mobile Location Center (E-SMLC).

According to embodiments herein a service requests a position of the wireless device in the communication network. Position herein meaning a very precise geographical position or a very broad position e.g. whether being within a certain service area or not. The service may request to know whether the wireless device 10 is within a certain geographical area such as an area of a shopping mall. The service may be provided by an application node or a Location Client Server (LCS), and the LCS may transmit a location request, to the network node 14, requesting position of the wireless device such as whether the wireless device 10 is within a certain geographical area.

The network node 14 receives the location request and may translate the geographical area into a set of service areas or cells. Thus, the network node 14 determines set of service areas based on the location request. The set of service areas may comprise one or more service areas.

The network node 14 then transmits a request for positioning of the wireless device to the controlling network node 13, which request indicates the set of service areas. The controlling network node 13 determines whether the wireless device 10 is within or not within the set of service areas, and initiates a paging procedure when the wireless device 10 is within the set of service areas. The controlling network node then transmits, to the network node 14, a response indicating whether the wireless device 10 is positioned within the set of service areas or not. This means that paging would only occur e.g. in a subset of the cells in a tracking area and wireless devices that are not in a relevant area won't detect the paging and thus not move to connected mode. This will, depending of the size of the relevant area relative to the size on the tracking area, save resources in wireless devices and the wireless communication network.

Figure 2:
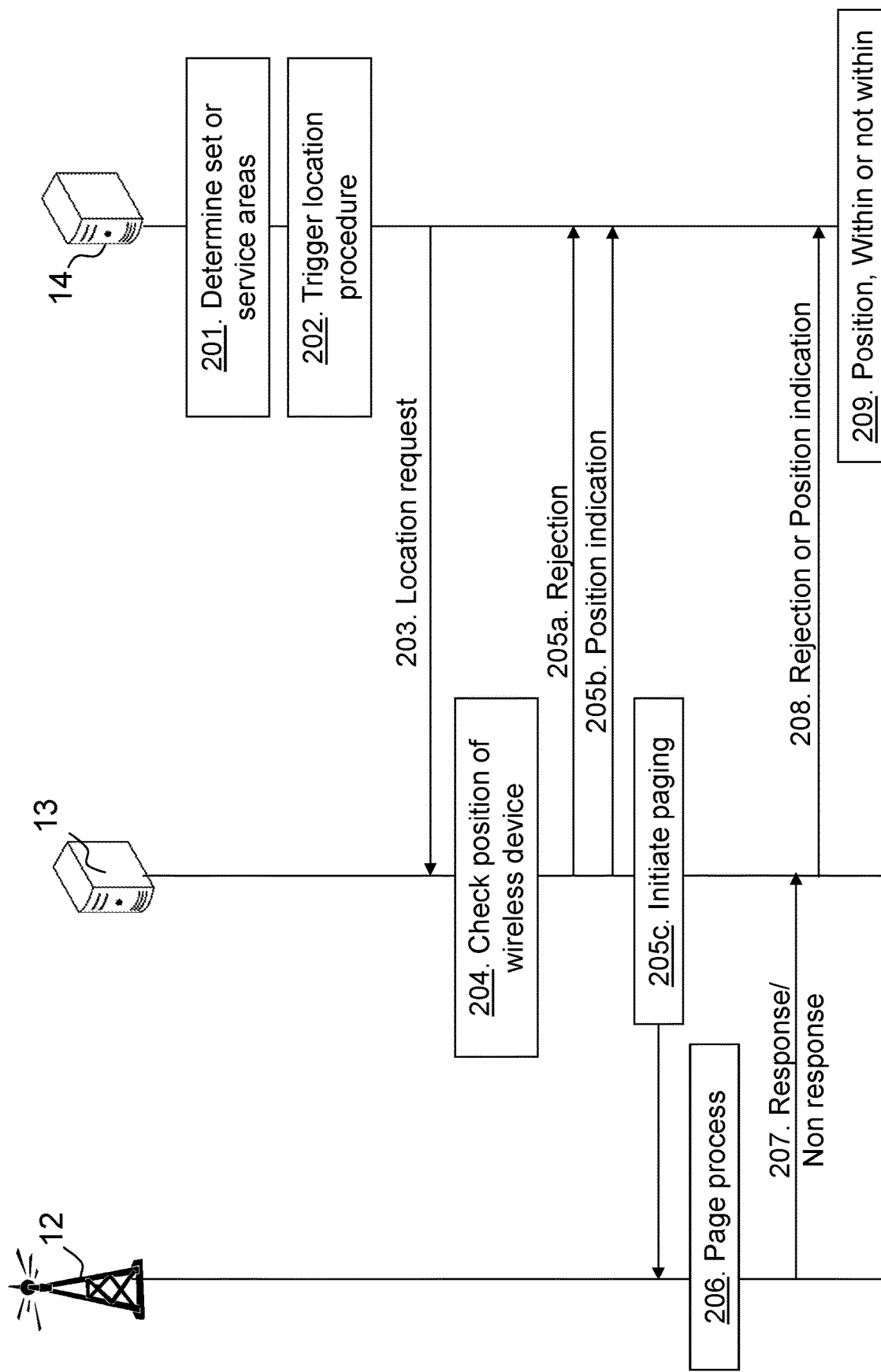
FIG. 2 is a combined flowchart and signalling scheme according to embodiments herein.

FIG. 2 is a combined flowchart and signaling scheme according to embodiments herein.

Action 201. The network node 13 determines the set of areas in which positioning of the wireless device is requested.

Action 202. The network node 13 may then trigger a location process for the wireless device 10 after translating set of areas.

Action 203. The network node 13 transmits to the controlling network node 14, a location request for positioning of the wireless device 10, which location request comprises the indication of the determined set of service areas.

Action 204. The controlling network node 13 checks position of wireless device 10. That is, checks whether the location of the wireless device is already known or assumed known at the controlling network node 13.

Action 205*a*. The controlling network node 13 may determine that the wireless device 10 is not within the set of service areas. For example, the controlling network node 13 determines that the wireless device 10 is connected to a service area not in the set of service area and reports that the wireless device 10 is unavailable with a rejection indication e.g. rejection message or an error message to the network node 14. Additionally or alternatively, the controlling network node 13 determines that the wireless device is not in a connected mode, i.e. not connected, and based on a latest location update information the wireless device 10 cannot be located in a service area of the set of service areas and reports that the wireless device 10 is unavailable with a rejection indication e.g. rejection message or an error message to the network node 14.

Action 205*b*. Alternatively, the controlling network node 13 may determine that the wireless device 10 is within the set of service areas. For example, the controlling network node 13 determines that the wireless device 10 is connected to a service area in the set of service area and reports position of the wireless device 10 to the network node 14. It should be noted that the controlling network node may initiate a positioning procedure for the wireless device 10 e.g. by transmitting a positioning request to the positioning node 15.

Action 205*c*. Alternatively, the controlling network node 13 may determine that the wireless device 10 is possibly located within the set of service areas and may initiate a paging procedure of the wireless device 10. For example, the controlling network node 13 may determine that the wireless device 10 is not connected and based on the latest location update information the wireless device 10 may be located in a service area of the set of service areas. The controlling network node 13 may then send a page request to one or more radio network nodes, such as the radio network node 12, that provide or serve service areas that are a part of the set of service areas and are a part of the tracking area where the wireless device 10 may be located.

Action 206. The radio network node 12 may then initiate paging process of the wireless device 10. I.e. the radio network node 12 may transmit page messages over one or more service areas. The radio network node 12 may receive a page response from the wireless device 10 or may not receive a page response.

Action 207. The radio network node 12 then responds to the page request with a paging response indicating that the wireless device 10 is within the set of service areas or does not respond to the page request in case the page response is not received at the radio network node 13.

Action 208. The controlling network node 13 then transmits a rejection indication or a position indication to the network node 14 based on the received, or not received, response from the one or more radio network nodes. It should be noted that the controlling network node may initiate a positioning procedure for the wireless device 10 in case the response indicates that the wireless device is present within the set of service areas. The positioning procedure may be initiated by transmitting a positioning request to the positioning node 15.

Action 209. The network node 14 may then determine and report to a service node or an application node that the wireless device 10 is within the set of service areas or not, or the position of the wireless device 10.

Figure 3:
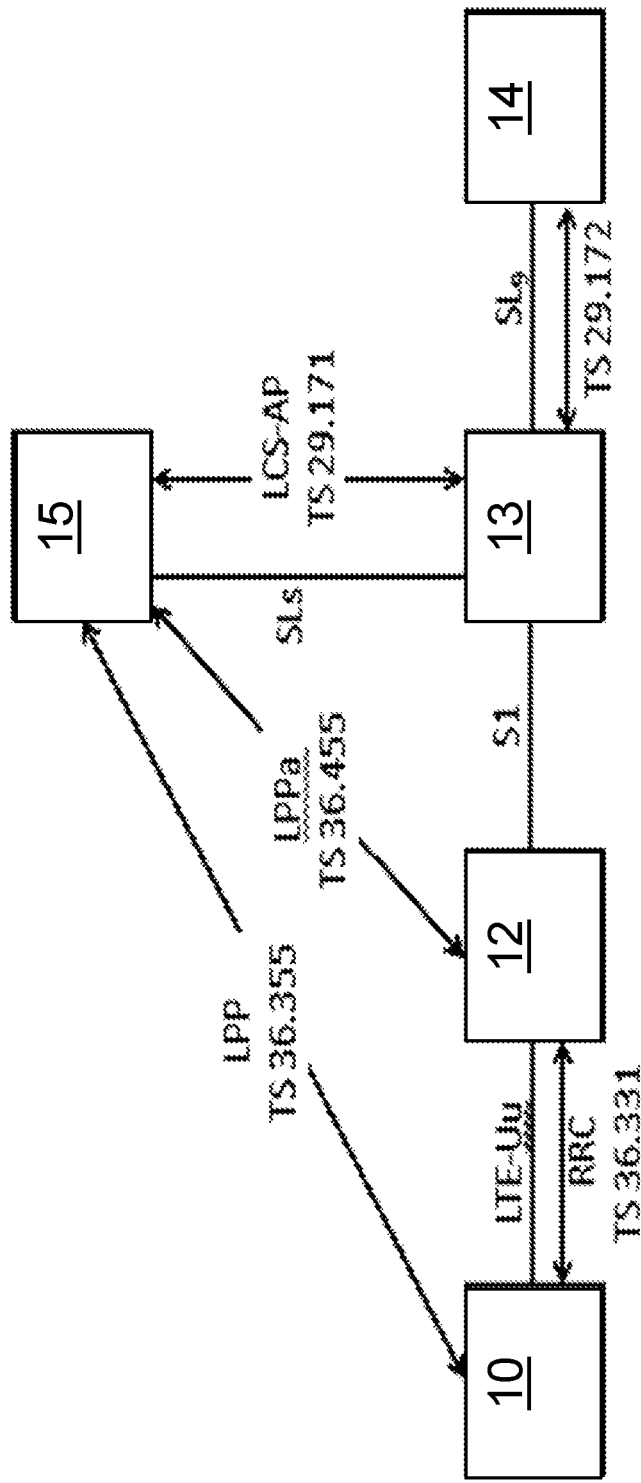
FIG. 3 shows an architecture that depicts the positioning architecture for LTE.

FIG. 3 shows an architecture that depicts the positioning architecture for LTE as defined in 3GPP TS 23.271 v.13.0.0. The wireless device 10 communicates with the radio network node 12 over the LTE-uu interface using radio resource control signaling according to TS 36.331. The radio network node 12 communicates with the controlling network node 13 over the S1 interface, and the controlling network node 13 communicates with the network node 14 over the SLg interface according to TS 29.172. The positioning node 15 communicates with the controlling network node 13 over SLs interface using LCS-AP according to TS 29.171. Furthermore, the positioning node 15 communicates with the radio network node 12 using LPPa according to TS 36.455, and with the wireless device 10 using LPP according to TS 36.355.

Figure 4:
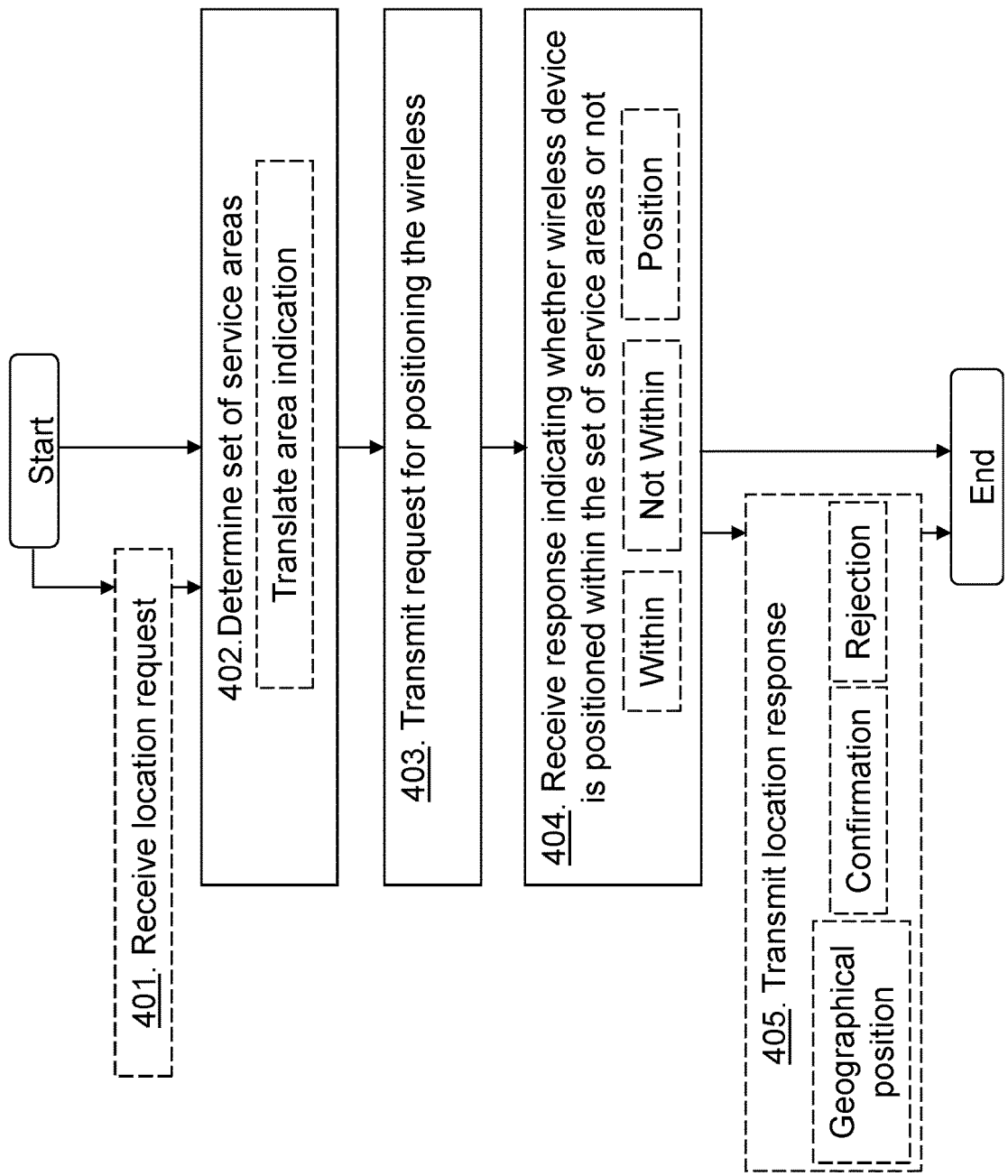
FIG. 4 shows a flowchart depicting a method performed by a network node according to embodiments herein.

FIG. 4 is a flowchart depicting a method performed by the network node 14, such as a gateway or a GMLC, for handling positioning of a wireless device in a wireless communication network. Positioning herein meaning a certain geographical position e.g. latitude and longitude, or within the set of service areas or not e.g. yes or no. The actions do not have to be taken in the order stated below, but may be taken in any suitable order. Actions performed in some embodiments are marked with dashed boxes.

Action 401. The network node 14 may receive a location request from a service node, e.g. a LCS client, requesting positioning of the wireless device 10, which location request comprises an area indication of the set of services. For example, the location request may indicate a certain geographical area.

Action 402. The network node 14 determines the set of service areas in which positioning of the wireless device is requested. E.g. the received area indication is a geographical area and the network node 14 may determine the set of areas by translating the area indication into the set of service areas.

Action 403. The network node 14 transmits the request for positioning of the wireless device to the controlling network node 13, which request comprises the indication of the set of service areas. The indication may comprise a list of service areas comprising one or more service areas.

Action 404. The network node 14 then receives the response from the controlling network node 13 indicating whether the wireless device is positioned within the set of service areas or not. The response may comprise information indicating that the wireless device is within the set of service areas, or a position of the wireless device 10 e.g. a latitude and longitude. The response may comprise an indication, the rejection indication, that the wireless device 10 is not positioned within the set of areas.

Action 405. The network node 14 may then transmit, back to the service node, a location response, which location response is based on the received response from the controlling network node 13. The location response may comprise the geographical position of the wireless device, or a confirmation or a rejection that the wireless device is positioned within the set of service areas.

Figure 5:
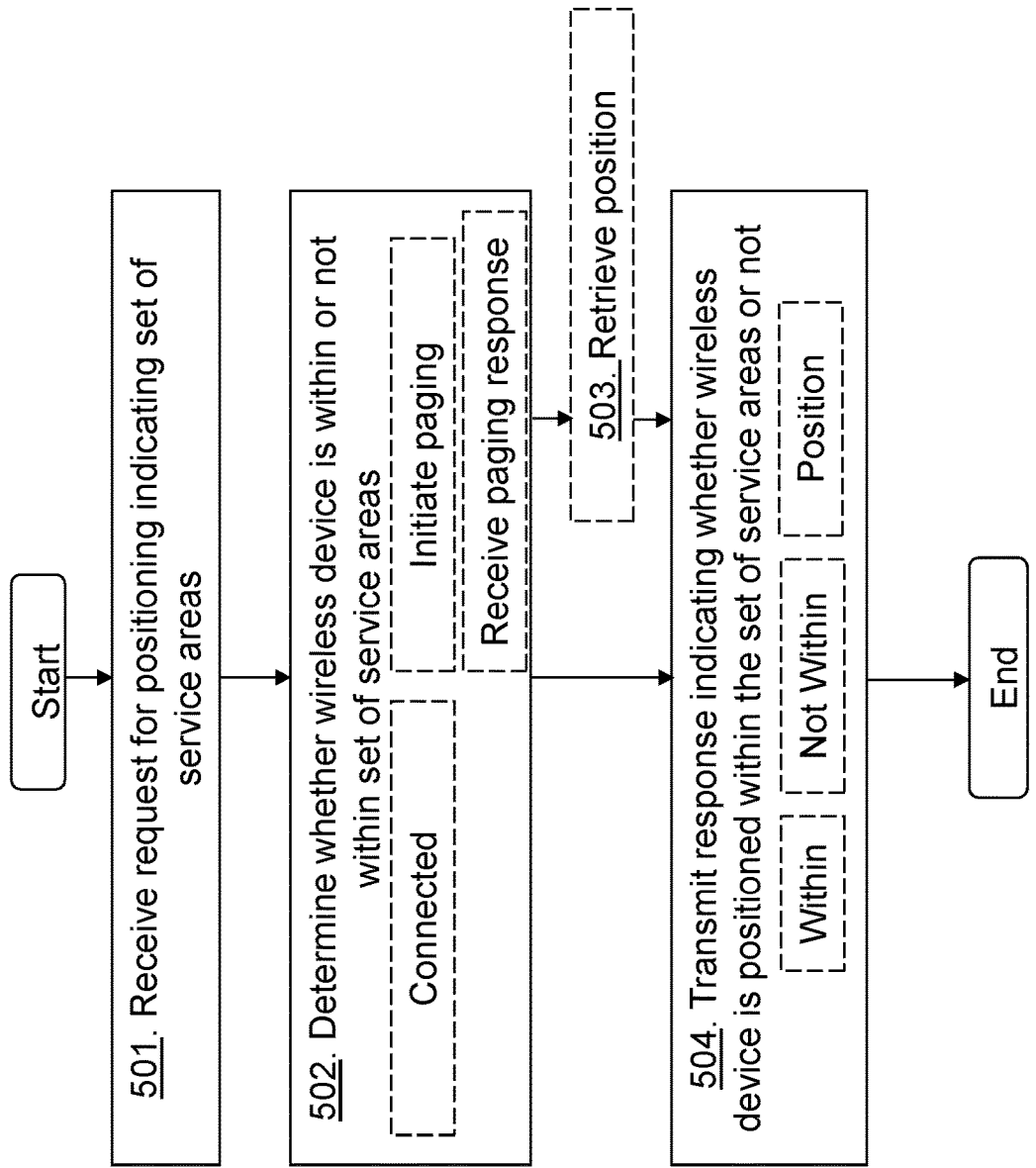
FIG. 5 is a flowchart depicting a method performed by a controlling network node according to embodiments herein.

FIG. 5 is a flowchart depicting a method performed by the controlling network node 13, such as an MME or SGSN, for positioning of the wireless device 10 in the wireless communication network 1.

Action 501. The controlling network node 13 receives the request for positioning of the wireless device from the network node 14, which request comprises the indication of the set of service areas in which positioning of the wireless device is requested.

Action 502. The controlling network node 13 determines whether the wireless device 10 is within or not within the set of service areas. The controlling network node may e.g. initiate the paging procedure of the wireless device in the set of service areas. E.g. the controlling network node 13 may send a page request to one or more radio network nodes that have service areas that are part of the set of service areas and are part of the tracking area where the wireless device 10 may be located. Thus, the controlling network node 13 may receive the paging response indicating presence of the wireless device 10 within the set of service areas. The controlling network node 13 may determine whether the wireless device 10 is within the set of service areas or not by checking whether the set of areas is comprised in the tracking area of the wireless device 10. The tracking area of the wireless device may comprise one or more lists of services areas for the wireless device 10.

Action 503. The controlling network node 13 may retrieve, from another network node e.g. the positioning node 15 such as a E-SM LC, the position of the wireless device.

Action 504. The controlling network node 13 transmits, to the network node 14, the response indicating whether the wireless device is positioned within the set of service areas or not. The response may comprise information indicating that the wireless device is within the set of service areas, or a position of the wireless device. The response may comprise an indication that the wireless device is not positioned within the set of areas.

E.g. the controlling network node 13 may upon receiving the paging response transmit the response back to the network node 14 which response comprises an indication indicating positioning of the wireless device 10 e.g. a confirmation response. Upon retrieving the position of the wireless device 10, the controlling network node 13 may transmit the response back to the network node, which response comprises the position of the wireless device 10.

The controlling network node 13 may determine that the wireless device 10 is not within the set of service areas by not receiving a paging response, thus, obtaining a non response to the paging procedure of the wireless device. Then the controlling network node 13 may transmit the response back to the network node that comprises the rejection indication indicating that the wireless device is not positioned within the set of areas. For example, radio network node 12 page the wireless device 10 but no paging response is received. The controlling network node 13 is informed, e.g. by not receiving a paging response within a time interval, that the paging response is not received and may send the response such as a Provide Location Answer (PLA) back to the network node 14 indicating and that wireless device 10 is unavailable or some error message to inform network node 14 that the wireless device 10 is outside target area.

In case the controlling network node 13 determines that the wireless device is within the set of service areas since the wireless device 10 is connected to a service area within the set of service areas, the controlling network node 13 may retrieve from e.g. the positioning node 15 the position of the wireless device. The controlling network node 13 may then transmit the response back to the network node that comprises the position of the wireless device 10. Thus, the controlling network node 13 finds that the wireless device 10 is connected to a service area out of the set of service areas and obtains and reports position of the wireless device 10.

In case the controlling network node 13 determines that the wireless device is not within the set of service areas, e.g. connected to a service area not within the set of service areas, the controlling network node 13 may transmit the response back to the network node 14 that comprises the rejection indication indicating that the wireless device is not positioned within the set of areas.

Figure 6:
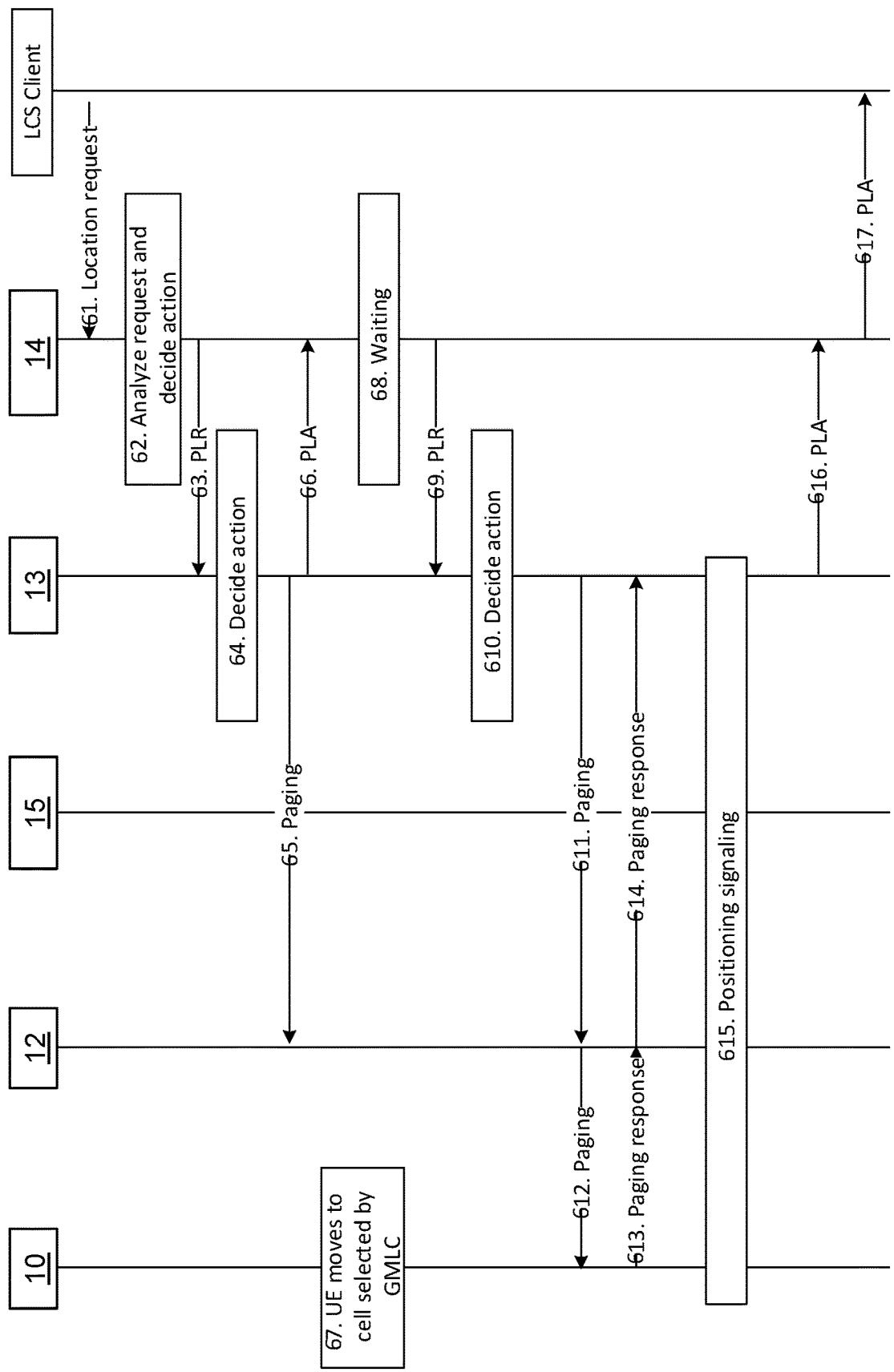
FIG. 6 is a schematic signalling scheme depicting some embodiments herein for handling positioning of wireless devices.

FIG. 6 is a flowchart depicting a method according to some embodiments herein.

Action 61. The LCS-client may transmit the location request indicating the specific area of interest for the service such as an area of a shopping mall or similar. For example, the LCS Client may request notification when the wireless device 10 enters or is within a certain geographical area, or a logical area the network node 14 would understand. This geographical area may be referred to as target area.

Action 62. The network node 14 may analyse the location request and decide action. The network node 14 may e.g. analyse the location request optionally using information of the wireless device location retrieved by any means. Examples of such means are notifications from the controlling network node 13 of used service area when wireless device 10 makes connection management activities or a request to Home Subscriber Server (HSS) to report last known used service for the wireless device 10. The network node 14 may translate the geographical area into the set of service areas within which it useful to position the wireless device 10. This may e.g. be a list denoted as target list or target cell list. Based on available information the network node 14 may then decide the action, e.g. it is decided that the request for location shall be sent to the controlling network node 13, which request comprises the target cell list.

Action 63. The network node 14 transmits the request for positioning of the wireless device 10. For example, the network node 14 may transmit a Provide Location Request message to the controlling network node 13. The request may include the target cell list.

Action 64. The controlling network node 13 may decide action based on the received request and information stored at the controlling network node 13. The controlling network node 13 may analyze the request and compare the target cell list with its knowledge of the wireless devices current location. Following may happen:

A: The controlling network node 13 may find that the wireless device 10 is connected to service area in target cell list and thus go to action 615 to obtain and report a location.

B: The controlling network node 13 may find that the wireless device 10 is connected to service area not in target cell list and thus go to action 616 and report that wireless device 10 is unavailable, or some error message to inform network node 14 that the wireless device 10 is outside target area.

C: The controlling network node 13 may find that the wireless device 10 is not connected and based on the latest location update information the wireless device 10 cannot be located in a service area that is part of target cell list and thus go to action 66 and report that wireless device wireless device 10 is unavailable, or some error message to inform network node 14 that the wireless device 10 is outside target area.

D: The controlling network node 13 may find that the wireless device 10 is not connected and based on the latest location update information the wireless device 10 may be located in a service area that is part of the target cell list and thus go to action 65 to try to page the wireless device 10.

Action 65. The controlling network node 13 may send a page request to those radio network nodes that have service areas that are part of the target cell list and are part of the tracking area where the wireless device 10 may be located. Applicable radio network nodes may page the wireless device 10 but in this case no response is received.

Action 66. The controlling network node 13 may detect that the wireless device don't respond to paging and sends a Provide Location Answer indicating that the wireless device is unavailable, or some error message to inform the network node 14 that the wireless device 10 is outside target area.

Action 67. The wireless device 10 moves such it is camping on a service area within the target cell list.

Action 68. The network node 14 may wait a predetermined interval, before trying to position the wireless device 10 again.

Action 69. The network node 14 may transmit the Provide Location Request message to the controlling network node 13. The request may include the target cell list.

Action 610. The controlling network node 13 may analyze the request and compare the target cell list with its knowledge of the wireless devices current location. Following may happen:

A: The controlling network node 13 may find that the wireless device 10 is connected to service area in target cell list and thus go to action 615 to obtain and report a location.

B: The controlling network node 13 may find that the wireless device 10 is connected to service area not in target cell list and thus go to action 616 and report that wireless device 10 is unavailable, or some error message to inform network node 14 that the wireless device 10 is outside target area.

C: The controlling network node 13 may find that the wireless device 10 is not connected and based on the latest location update information the wireless device 10 cannot be located in a service area that is part of target cell list and thus go to action 66 and report that wireless device wireless device 10 is unavailable, or some error message to inform network node 14 that the wireless device 10 is outside target area.

D: The controlling network node 13 may find that the wireless device 10 is not connected and based on the latest location update information the wireless device 10 may be located in a service area that is part of the target cell list and thus go to action 65 to try to page the wireless device 10.

Action 611. The controlling network node 13 may send a page request to the radio network node 12 that has one or more service areas that are a part of the target cell list and are a part of the tracking area where the wireless device 10 may be located. Applicable radio network nodes may page the wireless device 10

Action 612. The wireless device 10 may receive the page message from the radio network node 12.

Action 613. The wireless device 10 may further respond, to the page message, with the paging response.

Action 614. The radio network node 12 may further forward the paging response to the controlling network node 13.

Action 615. The controlling network node 13 may initiate positioning e.g. send a positioning request to the positioning node 15 and then receive a position of the wireless device 10 from the positioning node 15.

Action 616. The controlling network node 13 may transmit, to the network node 14, a Provide Location Answer (PLA) including e.g. a location estimate (or indicating positioning failed).

Action 617. The controlling network node 13 may, if information in action 616 indicates that the wireless device 10 is in the set of service areas, transmit a response, e.g. a PLA, is sent to the LCS Client indicating this. Otherwise the network node 14 may go to action 68 or send error indication to LCS Client.

Figure 7:
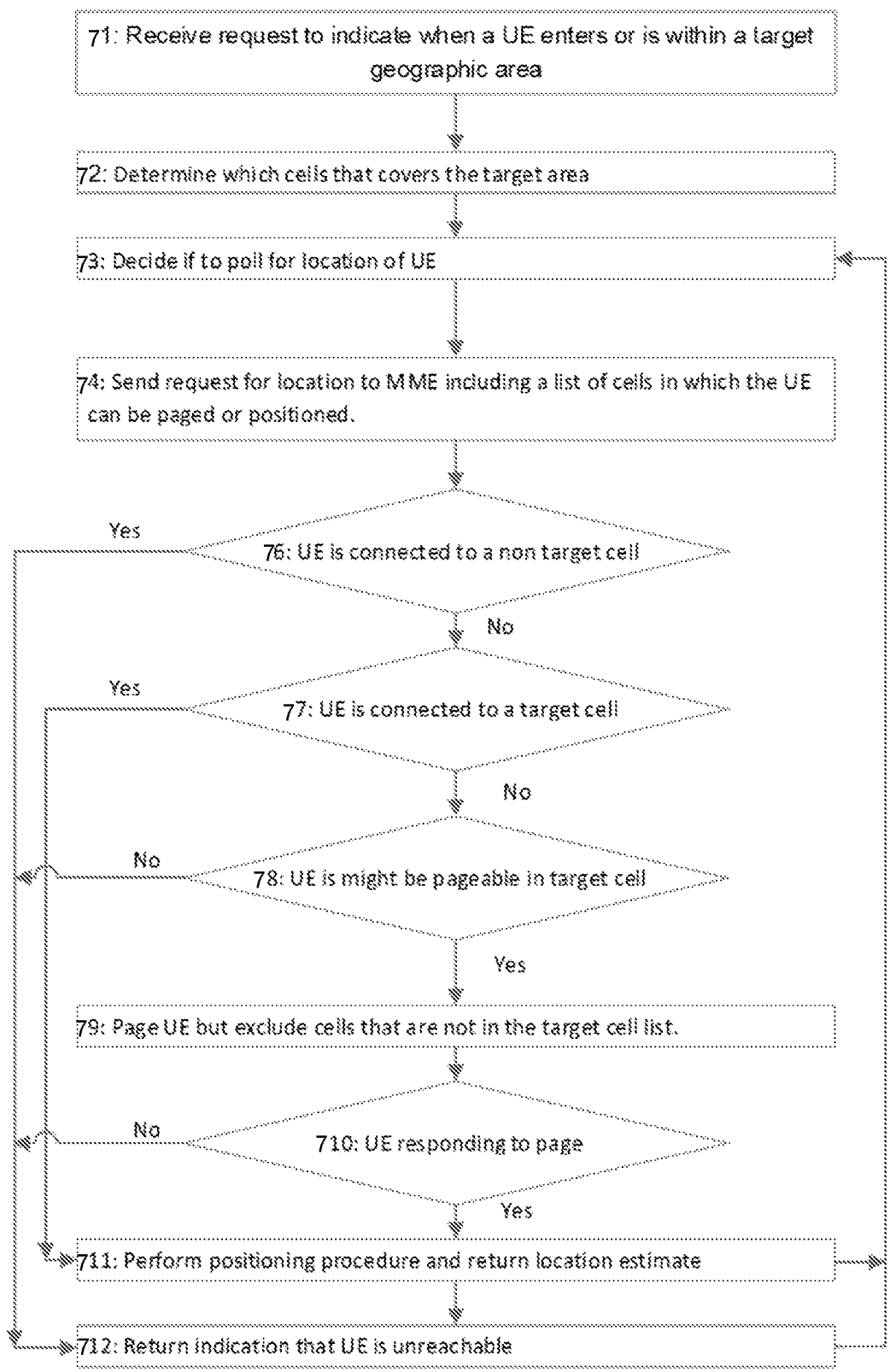
FIG. 7 is a schematic flowchart depicting some embodiments herein for handling positioning of wireless devices.

FIG. 7 is a schematic flowchart depicting some embodiments herein for handling positioning of wireless devices also referred to as UEs. The detailed description to FIG. 6 is applicable for understanding also FIG. 7.

Action 71. The LCS Client may request notification when the wireless device enters or is within the certain geographical area.

Action 72. The network node 14 may determine the cell or cells that cover the certain geographical area also called target area. The network node 14 may e.g. import a file with a geographical coverage of all cells or one or more parameters from which coverage can be calculated. Thus, the network node 14 may translate the certain geographical area into service area or areas based on the imported file or one or more parameters.

Action 73. The network node 14 may decide if to query or poll for location of the wireless device 10.

Action 74. The network node 14 may send the request for location to the controlling network node 13 such as the MME. The request includes a list of cells or service areas in which the wireless device can be paged or positioned.

Action 76. The controlling network node 13 may decide whether the wireless device 10 is connected to a non target cell or service area. That being the case go to action 712.

Action 77. The controlling network node 13 may decide whether the wireless device 10 is connected to a service area in the set or service areas in other words to a target cell or target service area. That being the case go to action 711.

Action 78. The controlling network node 13 may decide whether the wireless device 10 might be pageable in a service area of the set of service areas also referred to as target cell. That not being the case go to action 712.

Action 79. The controlling network node 13 may initiate a paging of the wireless device in the set of service areas. The controlling network node 13 thus initiates paging of or page the wireless device 10 but excludes cells not being in the target cell list.

Action 710. The wireless device 10 responds to the paging. That not being the case go to action 712.

Action 711. The controlling network node 13 may perform a positioning procedure and return a location estimate such as the position of the wireless device 10.

Action 712. The controlling network node 13 may return indication that the wireless device 10 is unreachable.

Figure 8:
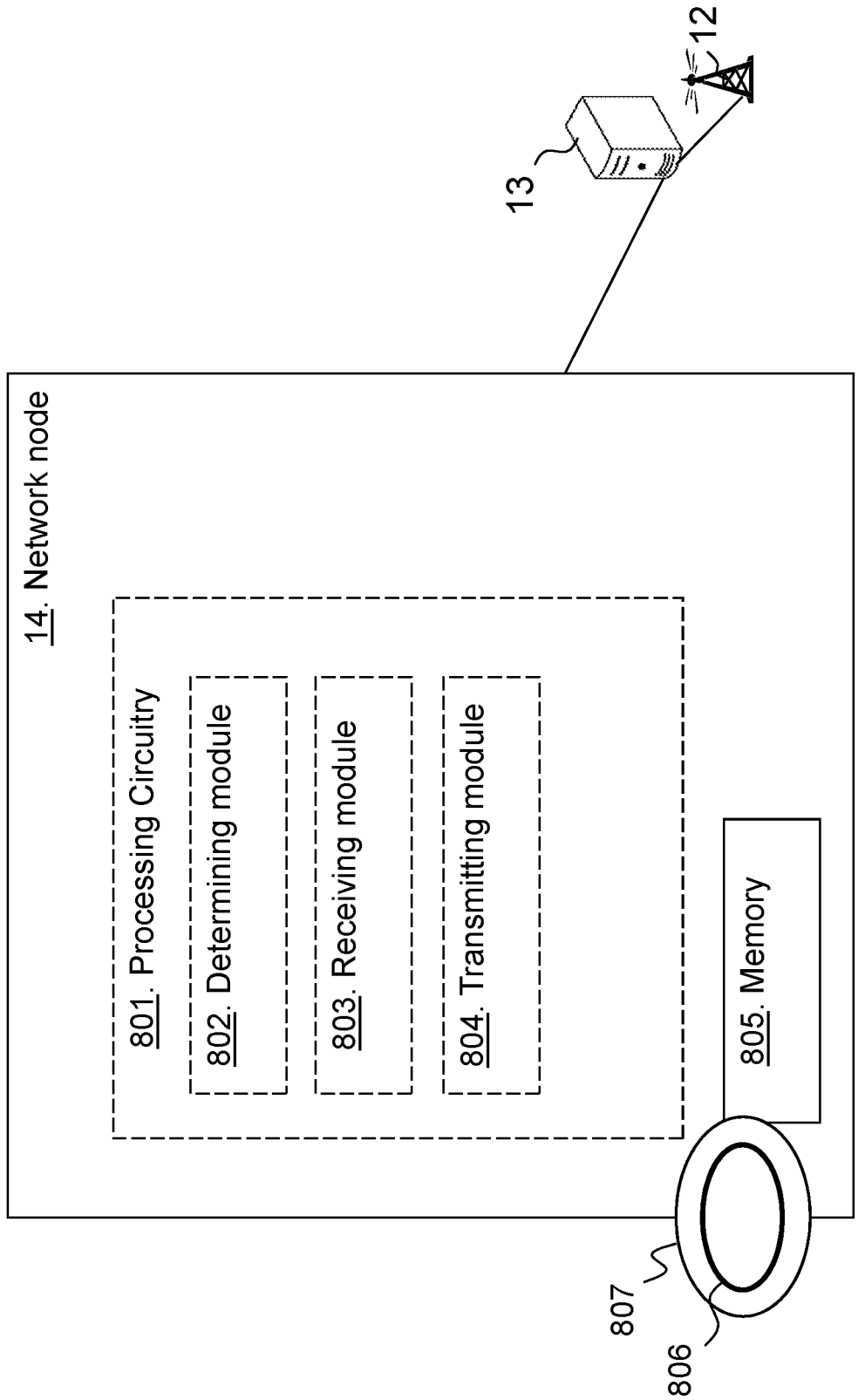
FIG. 8 is a schematic block diagram depicting a network node according to embodiments herein.

FIG. 8 is a schematic block diagram depicting the network node 14 such as a gateway or a GMLC, for handling positioning of the wireless device 10 in the wireless communication network 1.

The network node 14 may comprise a processing circuitry 801, e.g. one or more processors, configured to perform the methods herein.

The network node 14 may comprise a determining module 802. The network node 14, the processing circuitry 801, and/or the determining module 802 is configured to determine the set of service areas in which positioning of the wireless device is requested.

The network node 14 may further comprise a transmitting module 803, e.g. a transmitter or a transceiver. The network node 14, the processing circuitry 801, and/or the transmitting module 803 is configured to transmit the request for positioning of the wireless device to the controlling network node 13, which request comprises the indication of the set of service areas.

The network node 14 may comprise a receiving module 804, e.g. a receiver or a transceiver. The network node 14, the processing circuitry 801, and/or the receiving module 804 is configured to receive the response from the controlling network node 13 indicating whether the wireless device is positioned within the set of service areas or not. The response may comprise information indicating that the wireless device is within the set of service areas, or a position of the wireless device. Alternatively, the response may comprise the indication that the wireless device is not positioned within the set of areas.

The network node 14, the processing circuitry 801, and/or the receiving module 804 may further be configured to receive the location request from the service node requesting positioning of the wireless device 10, which location request comprises the area indication of the set of services. The network node 14, the processing circuitry 801, and/or the transmitting module 803 may further be configured to transmit, back to the service node, the location response, which location response is based on the received response from the controlling network node 13. The area indication may be a geographical area and the network node 14, the processing circuitry 801, and/or the determining module 802 may further be configured to determine the set of areas by being configured to translate the area indication into the set of service areas. The location response may comprise the geographical position of the wireless device, or the confirmation or the rejection that the wireless device is positioned within the set of service areas.

The network node 14 further comprises a memory 805 comprising one or more memory units. The memory 805 comprises instructions executable by the processing circuitry 801 to perform the methods herein when being executed in the network node 14. The memory 805 is arranged to be used to store e.g. information, data such as configurations, etc.

The methods according to the embodiments described herein for the network node 14 are respectively implemented by means of e.g. a computer program 807 or a computer program product, comprising instructions, i.e., software code portions, which, when executed on at least one processor, cause the at least one processor to carry out the actions described herein, as performed by the network node 14. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the network node 14. In some embodiments, the computer-readable storage medium may be a non-transitory computer-readable storage medium.

Figure 9:
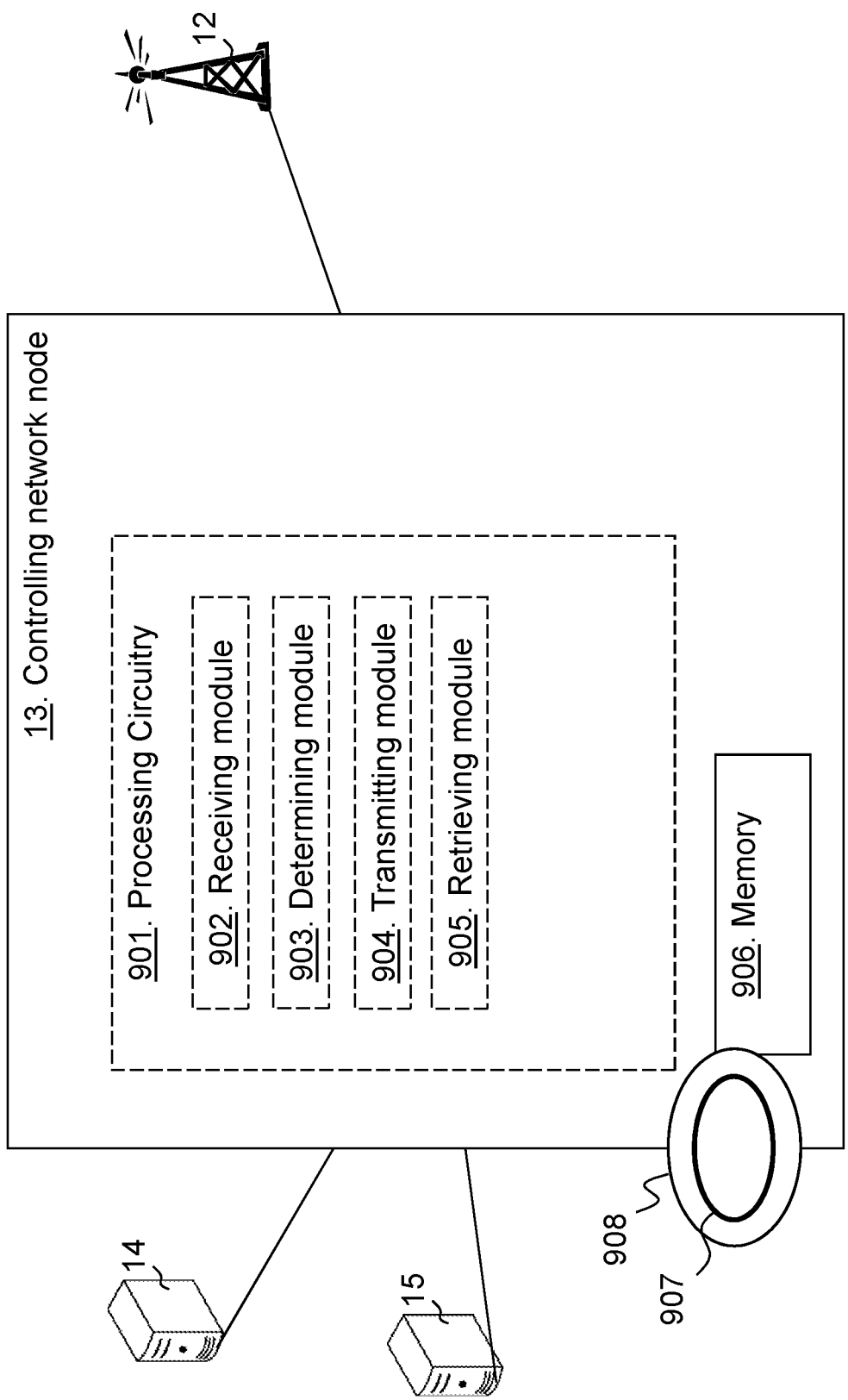
FIG. 9 is a schematic block diagram depicting a controlling network node according to embodiments herein.

FIG. 9 is a schematic block diagram depicting the controlling network node 13, such as an MME or a SGSN, for positioning of the wireless device in the wireless communication network 1.

The controlling network node 13 may comprise a processing circuitry 901, e.g. one or more processors, configured to perform the methods herein.

The controlling network node 13 may comprise a receiving module 902, e.g. a receiver or a transceiver. The controlling network node 13, the processing circuitry 901, and/or the receiving module 902 is configured to receive the request for positioning of the wireless device from the network node 14, which request comprises the indication of the set of service areas in which positioning of the wireless device is requested.

The controlling network node 13 may comprise a determining module 903. The controlling network node 13, the processing circuitry 901, and/or the determining module 903 is configured to determine whether the wireless device is within or not within the set of service areas.

The controlling network node 13 may comprise a transmitting module 904. The controlling network node 13, the processing circuitry 901, and/or the transmitting module 904 is configured to transmit, to the network node 14, the response indicating whether the wireless device is positioned within the set of service areas or not. The response may comprises information indicating that the wireless device is within the set of service areas, or a position of the wireless device. Alternatively, the response may comprise the indication that the wireless device is not positioned within the set of areas.

The controlling network node 13, the processing circuitry 901, and/or the determining module 903 may be configured to determine that the wireless device is within the set of service areas or not by being configured to initiate the paging procedure of the wireless device in the set of areas.

The controlling network node 13, the processing circuitry 901, and/or the determining module 903 may be configured to determine that the wireless device 10 is within the set of service areas by further being configured to receive the paging response indicating presence of the wireless device within the set of service areas. The transmitted response back to the network node 14 may comprise the indication indicating positioning of the wireless device 10.

The controlling network node 13 may comprise a retrieving module 905. The controlling network node 13, the processing circuitry 901, and/or the retrieving module 905 may be configured to retrieve, from another network node, the position of the wireless device, and the transmitted response back to the network node 14 may comprise the position of the wireless device 10.

The controlling network node 13, the processing circuitry 901, and/or the determining module 903 may be configured to determine that the wireless device 10 is not within the set of service areas by being configured to obtain the non response to the paging procedure of the wireless device. The transmitted response back to the network node may comprise the rejection indication indicating that the wireless device is not positioned within the set of areas.

The controlling network node 13, the processing circuitry 901, and/or the retrieving module 905 may be configured to, in case that the wireless device is determined to be within the set of service areas since the wireless device is connected to a service area within the set of service areas, retrieve, from another network node, the position of the wireless device. The transmitted response back to the network node 14 may comprise the position of the wireless device 10. The transmitter response back to the network node 14 may, in case that the wireless device is determined to be not within the set of service areas, comprise the rejection indication indicating that the wireless device is not positioned within the set of areas.

The controlling network node 13, the processing circuitry 901, and/or the determining module 903 may be configured to determine whether the wireless device is within the set of service areas or not by being configured to check whether the set of areas is comprised in the tracking area of the wireless device The controlling network node 13 further comprises a memory 906 comprising one or more memory units. The memory 906 comprises instructions executable by the processing circuitry 901 to perform the methods herein when being executed in the controlling network node 13. The memory 906 is arranged to be used to store e.g. information, data such as configurations, etc.

The methods according to the embodiments described herein for the controlling network node 13 are respectively implemented by means of e.g. a computer program 907 or a computer program product, comprising instructions, i.e., software code portions, which, when executed on at least one processor, cause the at least one processor to carry out the actions described herein, as performed by the controlling network node 13. The computer program 907 may be stored on a computer-readable storage medium 908, e.g. a disc or similar. The computer-readable storage medium 908, having stored thereon the computer program, may comprise the instructions which, when executed on at least one processor, cause the at least one processor to carry out the actions described herein, as performed by the controlling network node 13. In some embodiments, the computer-readable storage medium may be a non-transitory computer-readable storage medium.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network node receivers will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling positioning of a wireless device in a wireless communication network, the method comprising:
   determining a set of service areas in which positioning of the wireless device is requested;
   transmitting a request for positioning of the wireless device to a controlling network node, wherein the request comprises an indication of the set of service areas; and
   receiving a response from the controlling network node based on the request transmitted to the controlling network node, wherein the response indicates whether the wireless device is positioned within the set of service areas or not.

2. The method according to claim 1, wherein the response comprises information indicating that the wireless device is within the set of service areas, or a position of the wireless device.

3. The method according to claim 1, wherein the response comprises an indication that the wireless device is not positioned within the set of areas.

4. The method according to claim 1, further comprising:
   receiving a location request from a service node requesting positioning of the wireless device, wherein the location request comprises an area indication of the set of services, and transmitting, back to the service node, a location response, wherein the location response is based on the received response from the controlling network node.

5. The method according to claim 4, wherein the area indication is a geographical area and determining the set of areas comprises translating the area indication into the set of service areas.

6. The method according to claim 4, wherein the location response comprises a geographical position of the wireless device, or a confirmation or a rejection that the wireless device is positioned within the set of service areas.

7. A method performed by a controlling network node for positioning of a wireless device in a wireless communication network, the method comprising:
receiving a request for positioning of the wireless device from a network node, wherein the request comprises an indication of a set of service areas in which positioning of the wireless device is requested;
determining, based on the request received from the network node, whether the wireless device is within or not within the set of service areas; and
transmitting, to the network node, a response based on the determination indicating whether the wireless device is positioned within the set of service areas or not.

8. The method according to claim 7, wherein the response comprises information indicating that the wireless device is within the set of service areas, or a position of the wireless device.

9. The method according to claim 7, wherein the response comprises an indication that the wireless device is not positioned within the set of areas.

10. The method according to claim 7, wherein determining that the wireless device is within the set of service areas or not comprises initiating a paging procedure of the wireless device in the set of areas.

11. The method according to claim 10, wherein determining that the wireless device is within the set of service areas comprises receiving a paging response indicating presence of the wireless device within the set of service areas; and the transmitted response back to the network node comprises an indication indicating positioning of the wireless device.

12. The method according to claim 11, further comprising:
retrieving, from another network node, a position of the wireless device; and the transmitted response back to the network node comprises the position of the wireless device.

13. The method according to claim 10, wherein determining that the wireless device is not within the set of service areas comprises obtaining a non response to the paging procedure of the wireless device; and the transmitted response back to the network node comprises a rejection indication indicating that the wireless device is not positioned within the set of areas.

14. The method according to claim 7, further comprising, in case of determining that the wireless device is within the set of service areas since the wireless device is connected to a service area within the set of service areas,
retrieving, from another network node, a position of the wireless device; and the transmitted response back to the network node comprises the position of the wireless device.

15. The method according to claim 7, in case of determining that the wireless device is not within the set of service areas, the transmitted response back to the network node comprises a rejection indication indicating that the wireless device is not positioned within the set of areas.

16. The method according to claim 7, wherein determining whether the wireless device is within the set of service areas or not comprises checking whether the set of areas is comprised in a tracking area of the wireless device.

17. A computer program comprising instructions, wherein the instructions when executed in at least one processor cause the at least one processor to:
determine a set of service areas in which positioning of the wireless device is requested;
transmit a request for positioning of the wireless device to a controlling network node, wherein the request comprises an indication of the set of service areas; and
receive a response from the controlling network node based on the request transmitted to the controlling network node, wherein the response indicates whether the wireless device is positioned within the set of service areas or not.

18. A network node for handling positioning of a wireless device in a wireless communication network, the network node being configured to:
determine a set of service areas in which positioning of the wireless device is requested;
transmit a request for positioning of the wireless device to a controlling network node, wherein the request comprises an indication of the set of service areas; and
receive a response from the controlling network node based on the request transmitted to the controlling network node, wherein the response indicates whether the wireless device is positioned within the set of service areas or not.

19. The network node according to claim 18, wherein the response comprises information indicating that the wireless device is within the set of service areas, or a position of the wireless device.

20. The network node according to claim 18, wherein the response comprises an indication that the wireless device is not positioned within the set of areas.

21. The network node according to claim 18, further being configured to:
receive a location request from a service node requesting positioning of the wireless device, wherein the location request comprises an area indication of the set of services, and
transmit, back to the service node, a location response, wherein the location response is based on the received response from the controlling network node.

22. The network node according to claim 21, wherein the area indication is a geographical area and the network node is configured to determine the set of areas by being configured to translate the area indication into the set of service areas.

23. The network node according to claim 21, wherein the location response comprises a geographical position of the wireless device, or a confirmation or a rejection that the wireless device is positioned within the set of service areas.

24. A controlling network node for positioning of a wireless device in a wireless communication network, being configured to:
receive a request for positioning of the wireless device from a network node, wherein the request comprises an indication of a set of service areas in which positioning of the wireless device is requested;
determine, based on the request received from the network node, whether the wireless device is within or not within the set of service areas; and transmit, to the network node, a response based on the determination indicating whether the wireless device is positioned within the set of service areas or not.

25. The controlling network node according to claim 24, wherein the response comprises information indicating that the wireless device is within the set of service areas, or a position of the wireless device.

26. The controlling network node according to claim 24, wherein the response comprises an indication that the wireless device is not positioned within the set of areas.

27. The controlling network node according to claim 24, being configured to determine that the wireless device is within the set of service areas or not by being configured to initiate a paging procedure of the wireless device in the set of areas.

28. The controlling network node according to claim 27, being configured to determine that the wireless device is not within the set of service areas by being configured to obtain a non response to the paging procedure of the wireless device; and the transmitted response back to the network node comprises a rejection indication indicating that the wireless device is not positioned within the set of areas.

29. The controlling network node according to claim 27, being configured to determine that the wireless device is within the set of service areas by further being configured to receive a paging response indicating presence of the wireless device within the set of service areas; and the transmitted response back to the network node comprises an indication indicating positioning of the wireless device.

30. The controlling network node according to claim 29, being configured to retrieve, from another network node, a position of the wireless device; and the transmitted response back to the network node comprises the position of the wireless device.

31. The controlling network node according to claim 24, being configured to, in case that the wireless device is determined to be within the set of service areas since the wireless device is connected to a service area within the set of service areas, retrieve, from another network node, a position of the wireless device; and the transmitted response back to the network node comprises the position of the wireless device.

32. The controlling network node according to claim 24, wherein the transmitted response back to the network node comprises, in case that the wireless device is determined to be not within the set of service areas, a rejection indication indicating that the wireless device is not positioned within the set of areas.

33. The controlling network node according to claim 24, being configured to determine whether the wireless device is within the set of service areas or not by being configured to check whether the set of areas is comprised in a tracking area of the wireless device.

* * * * *